US010620805B2

(12) United States Patent
Chopra

(10) Patent No.: US 10,620,805 B2
(45) Date of Patent: Apr. 14, 2020

(54) METHOD AND SYSTEM FOR DISPLAYING AND NAVIGATING THROUGH DIGITAL CONTENT USING VIRTUAL SPHERE

(71) Applicant: Gauri Chopra, Mumbai (IN)

(72) Inventor: Gauri Chopra, Mumbai (IN)

( * ) Notice: Subject to any disclaimer, the term of this patent is extended or adjusted under 35 U.S.C. 154(b) by 0 days.

(21) Appl. No.: 15/982,203

(22) Filed: May 17, 2018

(65) Prior Publication Data

US 2019/0354263 A1   Nov. 21, 2019

(51) Int. Cl.
| | |
|---|---|
| *G06F 21/10* | (2013.01) |
| *G06F 3/0484* | (2013.01) |
| *G06F 3/0488* | (2013.01) |
| *G06Q 20/12* | (2012.01) |

(52) U.S. Cl.
CPC ........ *G06F 3/04842* (2013.01); *G06F 3/0488* (2013.01); *G06F 21/10* (2013.01); *G06Q 20/12* (2013.01); *G06F 2203/04802* (2013.01)

(58) Field of Classification Search
CPC ...... G06T 17/00; G06T 19/003; G06F 3/0483
USPC ........................................................ 345/619
See application file for complete search history.

(56) References Cited

U.S. PATENT DOCUMENTS

| | | | |
|---|---|---|---|
| 2015/0133199 A1* | 5/2015 | Lee .................... | G06Q 30/0241 455/566 |
| 2016/0005263 A1* | 1/2016 | Keilwert ............ | G07F 17/3211 463/33 |

* cited by examiner

*Primary Examiner* — Thomas J Lett
(74) *Attorney, Agent, or Firm* — Georgiy L. Khayet

(57) ABSTRACT

Provided are methods and systems for displaying, navigating, and manipulating digital content (e.g., e-books). An example system comprises a content module for storing digital content, a user interface, and a content navigation module. The user interface enables a user to interact with the digital content, which includes a plurality of content units. The content navigation module is configured to display a virtual sphere through the user interface, present a plurality of actionable buttons on a surface of the virtual sphere, where each actionable button is associated with one of the plurality of content units; position the virtual sphere in response to a user input, activate one of the actionable buttons in response to another user input, and present one of the content units that corresponds to the activated actionable button.

16 Claims, 4 Drawing Sheets

METHOD AND SYSTEM FOR DISPLAYING AND NAVIGATING THROUGH DIGITAL CONTENT USING VIRTUAL SPHERE

BACKGROUND

Technical Field

This disclosure generally relates to user interfaces for navigating and manipulating displayed content. More particularly, this disclosure relates, without limitation, to user interfaces for displaying digital content using a virtual sphere enabling easy content navigation and manipulation.

Description of Related Art

The approaches described in this section could be pursued, but are not necessarily approaches that have been previously conceived or pursued. Therefore, unless otherwise indicated herein, the approaches described in this section are not prior art to the claims in this document and are not admitted to be prior art by inclusion in this section.

The consumption of digital content has been drastically increased over the last years. Exemplary digital content includes electronic e-books (e-books), social media posts, multimedia content, text, images, video, and the like. It is common to use mobile devices, smart phones, tablet computers, and laptop computers to access digital content for reading or watching. Traditionally, e-books are organized as real-life e-books. As such, a user will need to navigate through the content of e-book by "flipping" virtual pages. Other types of digital content, such as social media posts, are organized in "feeds." In this scenario, the user will need to scroll through the feeds to find a post of his interest.

Thus, the existing user interfaces for navigating and manipulating the digital content are cumbersome and inefficient. In addition, it takes a long time for a user to find a desired page or post, and it can involve unreasonably large number of clicks or other user actions (e.g., it can take four or more clicks) to get to the content of interest.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure generally concerns user interfaces for displaying, navigating, and manipulating digital content, including, without limitation, digital texts, images, videos, e-books, social media posts, electronic news sources, such as newspapers or journals, web sites, and multimedia content. Digital content of this disclosure includes a plurality of individual digital content units such as e-book chapters, sections, collections of pages, blog posts, news articles, and the like. The digital content is represented by and displayed as a virtual sphere through a user interface. A user can easily navigate and manipulate the digital content through the virtual sphere. Individual digital content units, such as e-book chapters, are represented by a slice or any other part of the virtual sphere. As such, the user can position or rotate the virtual sphere to find the digital content unit of his interest, and access it by activating a corresponding part (slice) of the virtual sphere. The described user interface enables a faster and more efficient manner of content navigation and manipulation. This user interface also reduces the number, extent, or nature of the user inputs needed to access a desired content. For example, the user can navigate through a 500-page long e-book and access a certain page in just two or three user inputs. The methods described herein also improve the manner of computer operation for content navigation and manipulations, as well as conserve power because the user interface is more efficient and faster than the existing solutions.

According to one aspect of this disclosure, there is provided a system for displaying and navigating through digital content. An example system comprises a content module for storing the digital content, a user interface displayable by a mobile application or a web page, and a content navigation module. The user interface enables a user to interact with the digital content, which includes a plurality of content units. The content navigation module is configured to: cause displaying a virtual sphere through the user interface, where the virtual sphere represents the digital content; present a plurality of actionable buttons on a surface of the virtual sphere, where each actionable button is associated with one of the plurality of content units; position (e.g., rotate) the virtual sphere in response to a user input; activate one of the actionable buttons in response to another user input; and present, through the user interface, one of the content units that corresponds to the one of the actionable buttons that was activated by the user.

According to another aspect of this disclosure, there is provided a computer-implemented method for displaying and navigating through digital content. An example method comprises: providing a user interface enabling a user to interact with the digital content, where the digital content includes a plurality of content units; displaying a virtual sphere through the user interface, where the virtual sphere represents the digital content; presenting a plurality of actionable buttons on a surface of the virtual sphere, where each actionable button is associated with one of the plurality of content units; activating one of the actionable buttons in response to a user input; and presenting, through the user interface, one of the content units that corresponds to the activated actionable button.

According to yet another aspect of this disclosure, there is provided a non-transitory processor-readable medium having instructions stored thereon, which when executed by one or more processors, cause the one or more processors to implement the method for displaying and navigating through digital content as described above.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
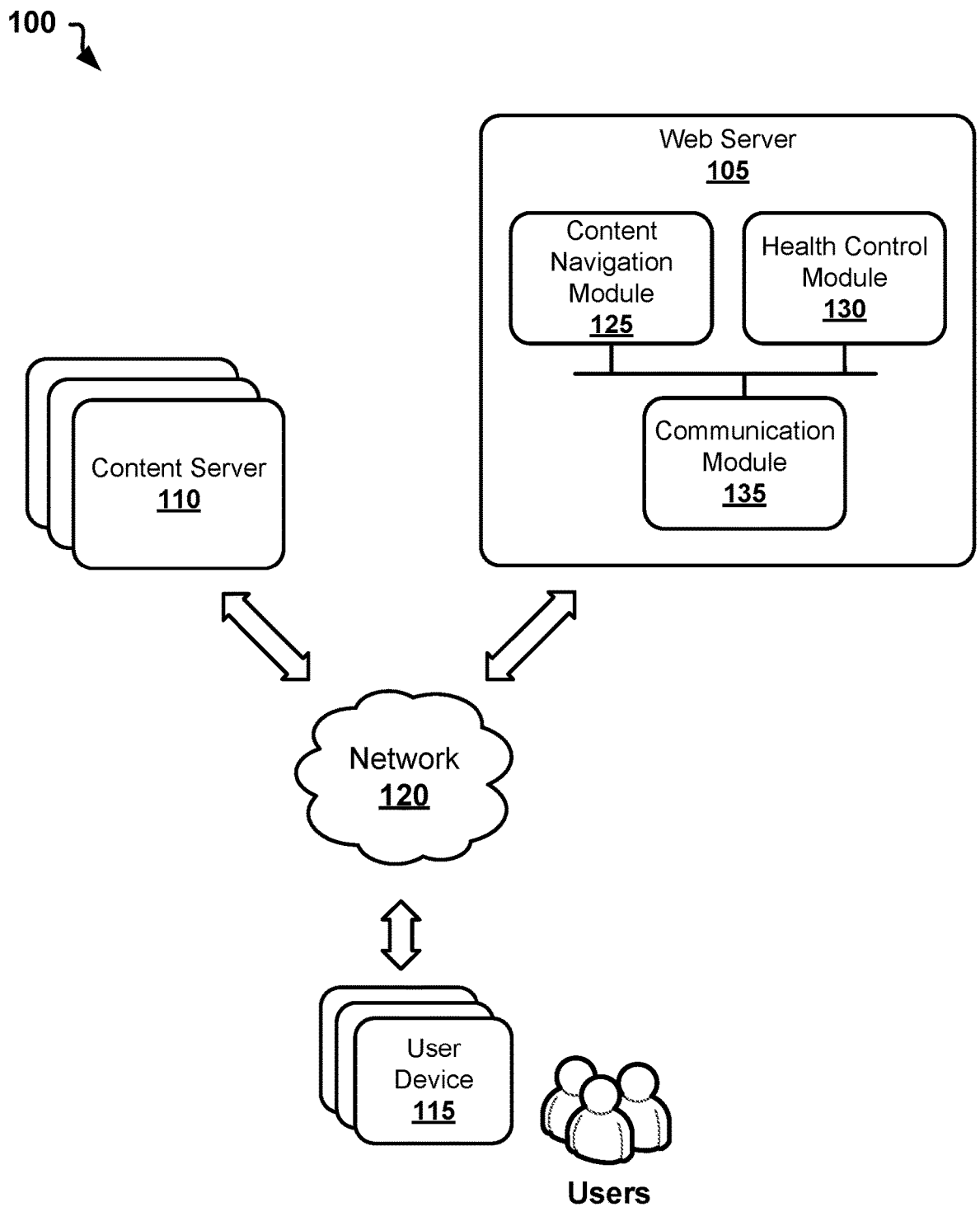
FIG. 1 shows a block diagram of an example system for displaying and navigation of digital content in accordance with one embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

This disclosure generally concerns methods and systems for displaying, navigation, and manipulation of digital content through a user interface. The user interface can be displayed on a screen of a user device such as a laptop computer, tablet computer, smart phone, e-reader, and alike. The user interface can be a part of a web page accessible through a browser of the user device or a part of a mobile (software) application downloaded and installed on the user device.

The user interface includes at least one virtual sphere which represents the digital content. In an example, the digital content can be an e-book containing a plurality of chapters. Each chapter includes a plurality of pages and can be referred to a digital content unit. The virtual sphere includes a plurality of actionable "soft" buttons on its surface, and each of the buttons is associated with a particular digital content unit (e.g., an e-book chapter). As such, when the user needs to access a certain page of the e-book, the user rotates the virtual sphere and clicks (taps) on a certain button to access a desired e-book chapter. Further, the user can navigate to any desired page within the chapter using traditional user interface navigation methods. The buttons on the surface of virtual sphere can be represented by gores of the virtual sphere. In some additional embodiments, the virtual sphere can be presented to the user through a virtual reality (VR) environment, where a user's head position and orientation, and also a user's glaze can be tracked so as to enable user's interaction with the virtual sphere through his head or eye movements.

Consequently, the user can easily see the overarching structure of the e-book by navigating and manipulating the virtual sphere. Each button can include a text, image or video to inform the user about the contents of a corresponding chapter. Thus, the user interface and methods for navigation through the digital content are easy and user friendly. For example, a 500-page long e-book can be conveniently presented on a single screen of the user interface, while the user can access a desired page in less than three clicks or taps. Notably, the digital content does not necessarily include e-books, rather it can include social media posts, web content, multimedia content, interactive content, maps, quizzes, and any other form of text, images, video, or audio. Digital content units can represent various independent sections of the content.

In some implementations, some digital content units can be "unlocked" and readily available for the user, while the remaining of the digital content units can be "locked" and not readily available for the user to access. To unlock the locked digital content units, the user will need to perform certain predetermined tasks (e.g., read or access certain other unlocked digital content parts, answer quizzes, win in a computer game, etc.) or make a purchase to obtain the right to access a certain digital content unit. This becomes especially useful for education purposes. For example, when an instructor assigns students to read a particular chapter in an e-book, there is no need for the students to buy the whole e-book. Rather, the students can purchase the assigned chapter for a fraction of the price of the whole e-book.

In some additional implementations, the user interface may provide a user with additional interactive features, such as a meditation therapy feature. For example, when the user is tired, he can activate a therapy button arranged on the surface of virtual screen to start a sound meditation therapy. In other embodiments, the user activity can be monitored to determine when the meditation therapy feature shall be activated. For example, is the user reads or watches the digital content longer than a certain period (e.g., 20 or 60 minutes), the meditation therapy feature is automatically activated to enable the user to rest his eyes.

Aspects of this disclosure will now be presented with reference to a system and methods for displaying and navigating through digital content. These system and methods are described in this section and illustrated in the accompanying drawings by various blocks, components, circuits, steps, operations, processes, algorithms, and the like, collectively referred to as "elements." These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a processing system that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). Software also means instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

The term "user device" shall mean a portable electronic device with capabilities of displaying digital content and receiving user inputs. Some examples of user device include, without limitation, a mobile device, cellular phone, mobile phone, smart phone, tablet computer, laptop computer, desktop computer, personal digital assistant, music player, multimedia player, portable computing device, gaming device, game console, television device, set-top box, virtual reality displaying device (e.g., virtual reality headset), and so forth. The user device can run a browser allowing to access a web page having a user interface as described herein. Alternatively, the user device can have installed a software or mobile application which provides the user interface as described herein.

The term "digital content" shall mean a collection of two or more digital content units. Each digital content unit represents one or more of the following: digital text, image, video, audio, map, interactive content, multimedia content, game, quiz, and the like. One example of digital content includes an e-book, where chapters, sections, or paragraphs of the e-book are digital content units, and where each digital content unit includes one or more e-book pages. Another example of digital content includes a web content, where individual web sites are digital content units, and each digital content unit includes one or more web pages or social media posts.

The term "user interface" shall mean a user interface such as a graphical user interface (GUI), virtual reality (VR) user interface, or Augmented Reality (AR) user interface enabling a user to interact with digital content using one or more user inputs as defined herein. The user interface can display a virtual sphere ("Globe") and enable the user to interact with it.

The term "user input" shall mean an instruction given by a user for interacting with digital content, virtual sphere, and/or a user interface as defined herein. The user inputs can be generated by or through one or more of the following: a mouse, keyboard, touchscreen, microphone, webcam, touchpad, trackpad, image sensor, motion sensor, trackball, and the like. Some examples of user inputs can include a click, finger swipe, tap, key press, hand gesture, voice command, and so forth. In response to user inputs, the user interface can position (rotate) the virtual sphere, activate buttons arranged on the surface of the virtual sphere, access content, flip pages, scroll content, etc.

The term "actionable button" shall mean a graphical control element that provides the user a way to trigger an event, such as opening a digital content unit for reading or watching. The actionable buttons of this disclosure can include a text, image, or video to inform the user of its purpose. The actionable buttons can also be represented by a part of a surface associated with the virtual sphere. For example, an actionable button can be represented by a sphere gore, sphere sector, sphere slice, sphere segment, sphere cap, or any other part of the sphere surface.

The term "module" shall be construed to mean a hardware device, software, or a combination of both. For example, a hardware-based module can use either one or more microprocessors, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers connected into a network. Hardware or software implementations can depend on particular system implementation and constraints. For example, a communication module may include a radio modem, Ethernet module, network interface, communication port, or circuit terminals. In other embodiments, a communication module may include software, software procedure, or software-based function configured to receive and transmit data by a hardware device, such as a processor. Other implementations of communication module can involve programmable and non-programmable microcontrollers, processors, circuits, computing devices, servers, and the like.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows a block diagram of an example system 100 for displaying and navigation of digital content in accordance with one embodiment. System 100 includes one or more web servers 105, one or more content servers 110, and one or more user devices 115, all of which can interact with one another through one or more data networks 120. As discussed above, user devices 115 are operated by users. Further, each user device 115 has a browser or a mobile (software) application to access digital content via a user interface. The digital content is stored or maintained by one or more content modules. Content servers 110 include the content modules. The user interface is enabled or provided by one or more web servers 105. Web servers 105 can either provide a web service for the mobile software application installed on user device 115 or host a website which can be accessible by user device 115.

Figure 2:
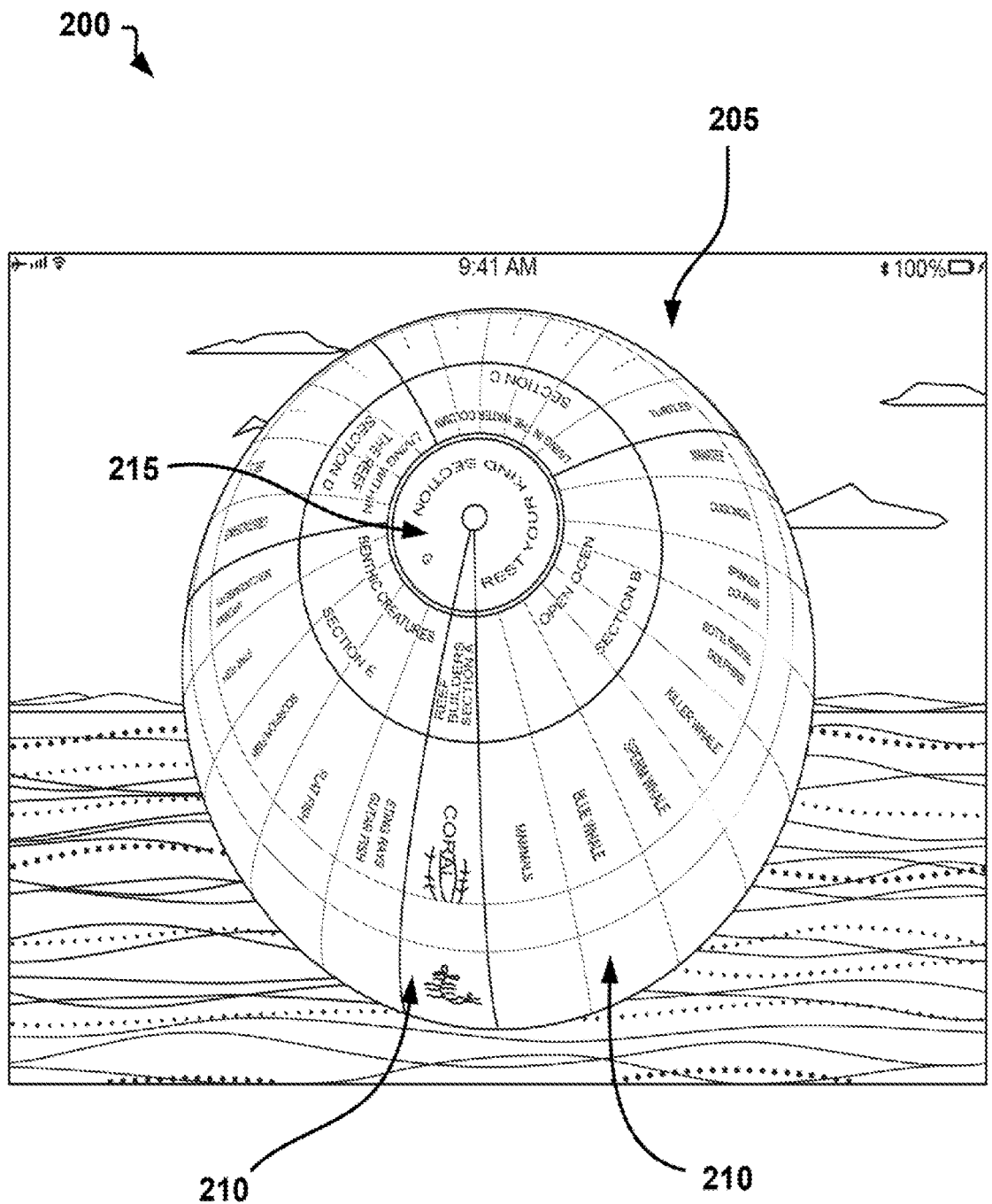
FIG. 2 shows an example user interface including a virtual sphere according to one embodiment.

Web server 105 is generally configured to enable, cause, or provide displaying the user interface on a screen of user device 115. The user interface includes at least one virtual sphere. An example virtual sphere is shown in FIG. 2 and discussed below. The user interface enables the user to interact, navigate through, or manipulate with the virtual sphere by user inputs. For example, the user can position or rotate the virtual sphere, zoom-in or zoom-out the virtual sphere, change background, set what digital content that is represented by the virtual sphere, change graphical parameters of the virtual sphere, and the like. In addition, the user can activate one or more actionable buttons arranged on a surface of the virtual sphere. Accordingly, web server 105 includes a content navigation module 125 that is configured to: cause displaying the virtual sphere through the user interface, present the actionable buttons on the surface of the virtual sphere; position (rotate) the virtual sphere in response to a first user input; activate one of the actionable buttons in response to a second user input; and present, through the user interface, one of the content units that corresponds to the actionable button that was activated by the user.

Web server 105 can optionally include a health control module 130 configured to monitor user activity and cause providing a meditation sound therapy through the user interface or other interactive features. The meditation sound therapy can be provided based on the user activity. For example, health control module 130 can automatically activate the meditation sound therapy when the user is actively engaged into the digital content longer than a predetermined period. The predetermined period can be 10, 20, 30, 40, 50, 60 or more minutes.

Web server 105 also includes a communication module 135 configured to receive and process user inputs, and also process and serve the digital content and the virtual sphere to user devices 115. Communication module 135 can also enable bidirectional data communication between web server 105 and content servers 110, and between web server 105 and user devices 115.

Data network 120 refers to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, data network 120 includes a corporate network, data center network, service provider network, mobile operator network, or any combinations thereof.

In other embodiments, all functionalities of web servers 105 and content servers 110 can be integrated into user devices 115. In these embodiments, a single user device 115 implements all of the functionalities and method steps as described herein.

FIG. 2 shows an example user interface 200 including a virtual sphere 205 according to one embodiment. User interface 200 can be displayed on a screen of user device 115. User interface 200 can be a part of a web page or it can be a screen of software (mobile) application installed on user device 115. The user can interact with user interface 200 through user inputs. For example, the user can rotate virtual sphere 205 in any direction, zoom-in, zoom-out, or change any other graphical characteristics. The user can select digital content (e.g., an e-book) that he wants to access among a plurality of digital contents. The selected digital content will be presented via virtual sphere 205. The surface of virtual sphere 205 includes a plurality of actionable buttons 210 and 215. Each actionable button 210 is associated with a certain digital content unit (e.g., a chapter of the e-book). When the user activates one of actionable buttons 210, user interface 200 starts displaying a corresponding digital content unit. Each actionable button 210 can include a title of the corresponding digital content unit or any other digital data such as images, moving images, video, or interactive content. When the user activates actionable button 215, the music therapy feature is activated to provide a temporary meditation session.

Figure 3:
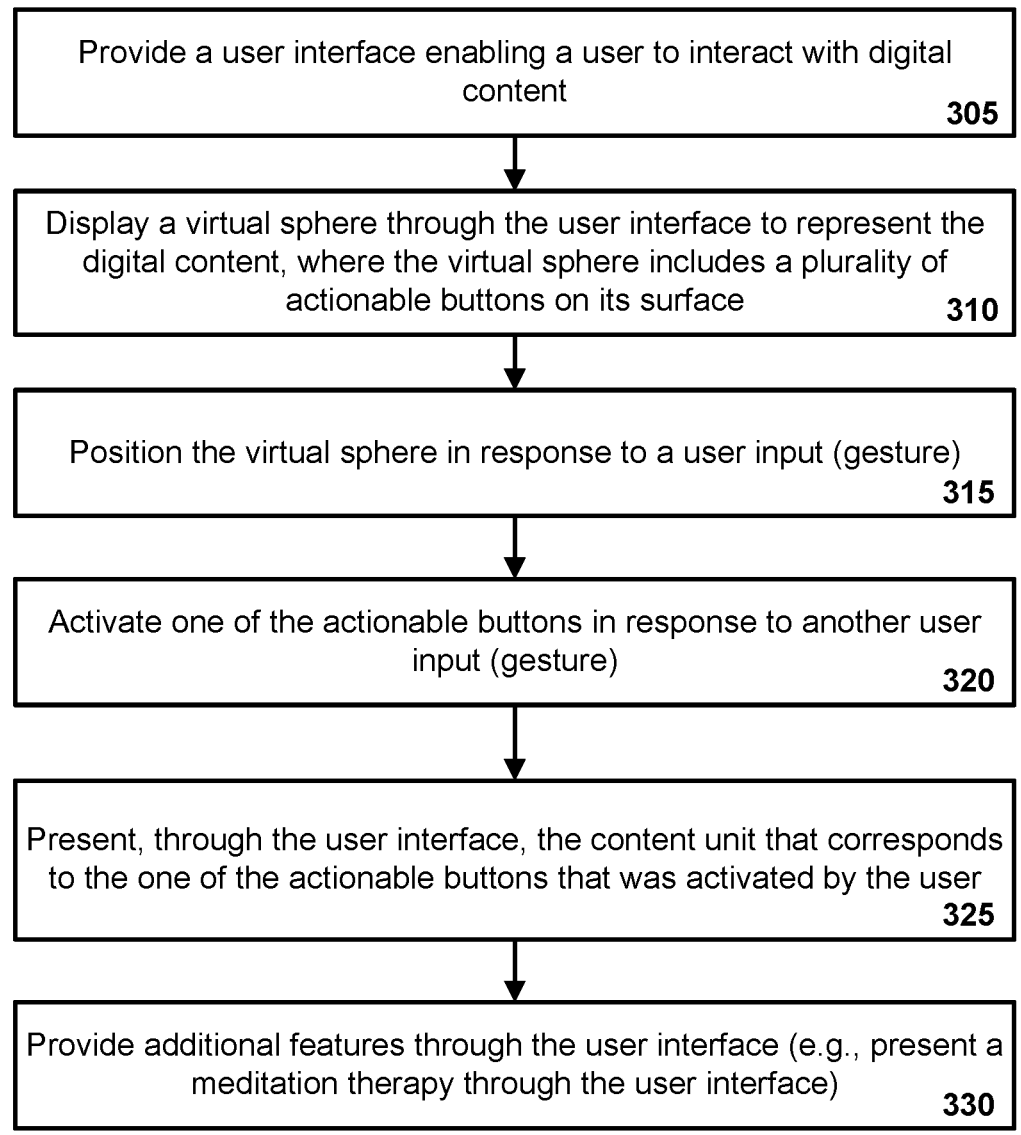
FIG. 3 shows a process flow diagram showing a method for displaying and navigating through digital content according to an example embodiment.

FIG. 3 shows a process flow diagram showing a method 300 for displaying and navigating through digital content according to an example embodiment. Method 300 may be performed by processing logic that may comprise hardware, software, or a combination of both. In one example embodiment, the processing logic refers to one or more elements of system 100. Below recited operations of method 300 may be implemented in an order different than described and shown in the figure. Moreover, method 300 may have additional operations not shown herein, but which can be evident for those skilled in the art from the present disclosure. Method 300 may also have fewer operations than outlined below and shown in FIG. 3.

Method 300 commences at step 305 with web server 105 or user device 115 providing a user interface is provided to enable a user to interact with digital content. As discussed above, the digital content includes a plurality of content units.

At step 310, web server 105 or user device 115 displays a virtual sphere through the user interface on a screen of user device 105. The virtual sphere represents the digital content. An example of the virtual sphere is shown in FIG. 2. The virtual sphere includes a plurality of actionable buttons arranged on a surface of the virtual sphere (for example, as shown in FIG. 2). As such, the user interface is configured to enable the user to interact with the virtual sphere through user inputs. Notably, each actionable button is associated with one of the plurality of content units.

At optional step 315, web server 105 or user device 115 receives a user input and positions (e.g., rotates) the virtual sphere in response to the user input. For example, the user can make a finger swipe gesture, double tap, force touch, or any other input over the touchscreen which would cause positioning the virtual sphere in a corresponding direction associated with the user input.

At step 320, web server 105 or user device 115 receives another (second) user input and activates one of the actionable buttons in response to this user input. For example, the user can tap or click on of the actionable buttons. Notably, steps 315 and 320 can be performed in an opposite order. In addition, any of steps 315 and 320 can be performed multiple times.

At step 325, web server 105 or user device 115 presents through the user interface one of the content units that corresponds to the actionable button activated at step 320. Notably, in some optional embodiments, when the user interface presents or displays one of the digital content units, the virtual sphere is not displayed through the user interface. In other embodiments, when the user interface presents or displays one of the digital content units, the digital content unit is displayed over the virtual sphere.

In some embodiments, the digital content includes a plurality of pages (posts, images, videos, or other content items). Importantly, the user interface enables the user to access a desired content item (e.g., a certain page in an-book) in three or less user inputs. In this scenario, a first user input causes rotation of the virtual sphere, a second user input activates one of the actionable buttons, which is associated with a portion of the digital content, and a third user input causes opening the desired digital content item within the selected digital content unit.

In yet additional embodiments, one or more of the content units are unlocked content units which are readily available for access by the user, while the remaining ones of the content units are locked content units which are unavailable for access by the user. When one given content unit (e.g., e-book chapter) is locked, all of its corresponding content items (e.g., e-book pages) are also locked. The user can be enabled to unlock one or more locked content units. As such, the user interface is configured to unlock one or more of the locked content units. For example, web server 105 or user device 115 is configured to unlock one or more of the locked content units upon a user payment. In other embodiments, web server 105 or user device 115 is configured to unlock one or more of the locked content units upon determining that the user read or viewed one or more of the unlocked content units. In additional embodiments, web server 105 or user device 115 is configured to unlock one or more of the locked content units upon determining that the user won or participate in a computer game, quiz, or questionnaire.

At optional step 330, web server 105 or user device 115 provides one or more additional interactive features through the user interface. In one non-limiting example, web server 105 or user device 115 presents a meditation (sound) therapy through the user interface. For example, the user makes a user input to activate a predetermined actionable button arranged on the surface of the virtual sphere so as to initiate the meditation therapy. In another example, the meditation therapy is presented upon determining that the user is actively engaged with the digital content through the user interface longer than a predetermined period.

Figure 4:
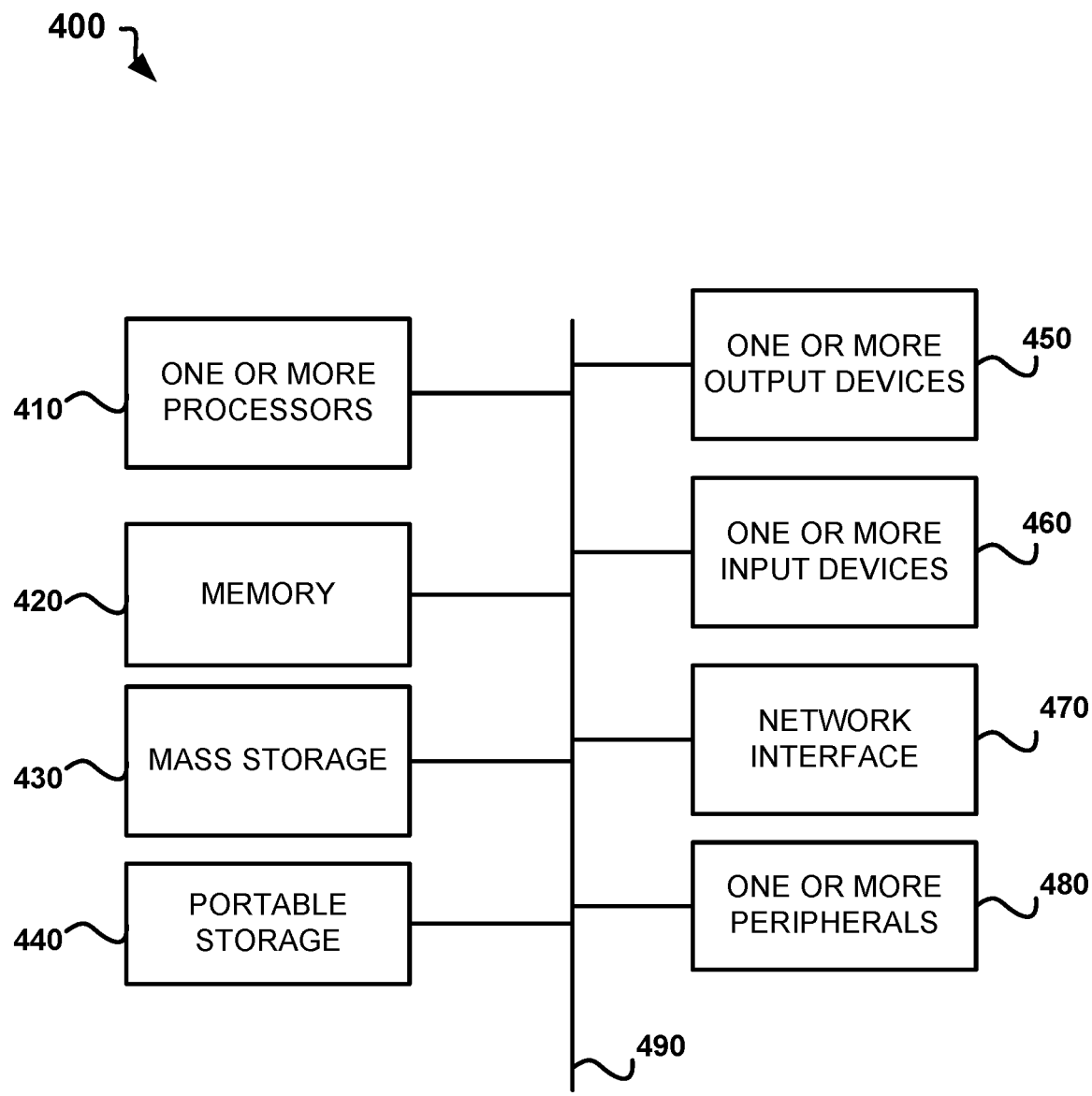
FIG. 4 is a computer system that may be used to implement the methods for displaying and navigating through digital content as described herein.

FIG. 4 is a block diagram illustrating an example computer system 400 suitable for implementing the methods for displaying and navigating through the digital content as described herein. Computer system 400 may be an instance of system 100, user device 115, content server 110, or web server 105. FIG. 4 illustrates just one example of computer system 400 and in some embodiments computer system 400 may have fewer elements than shown in FIG. 4 or more elements than shown in FIG. 4.

Computer system 400 includes one or more processors 410, a memory 420, one or more storage devices 430, a portable storage 440, one or more input devices 450, one or more output devices 460, network interface 470, and one or more peripherals 480. These elements can be operatively interconnected via a communication bus 490. Processors 410 are, in some examples, configured to implement functionality and/or process instructions for execution within computer system 400. For example, processors 410 may process instructions stored in memory 420 or instructions stored on storage devices 430. Such instructions may include components of an operating system or software applications.

Memory 420, according to one example, is configured to store information within computer system 400 during operation. Memory 420, in some example embodiments, may refer to a non-transitory computer-readable storage medium or a computer-readable storage device. In some examples, memory 420 is a temporary memory, meaning that a primary purpose of memory 420 may not be long-term storage. Memory 420 may also refer to a volatile memory, meaning that memory 420 does not maintain stored contents when memory 420 is not receiving power. Examples of volatile memories include RAM, dynamic random-access memories (DRAM), static random-access memories (SRAM), and other forms of volatile memories known in the art. In some examples, memory 420 is used to store program instructions for execution by processors 410. Memory 420, in one example, is used by software. Generally, software refers to software applications suitable for implementing at least some operations of the methods as described herein.

Storage devices 430 can also include one or more transitory or non-transitory computer-readable storage media and/or computer-readable storage devices. In some embodiments, storage devices 430 may be configured to store greater amounts of information than memory 420. Storage devices 430 may further be configured for long-term storage of information. In some examples, the storage devices 430 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 4, computer system 400 may also include one or more input devices 450. Input devices 450 may be configured to receive input from a user through tactile, audio, video, or biometric channels. Examples of input devices 450 may include a keyboard, keypad, mouse, trackball, touchscreen, touchpad, microphone, one or more video cameras, image sensors, fingerprint sensors, or any other device capable of detecting an input from a user or other source, and relaying the input to computer system 400 or components thereof. As such, input devices 450 can be used by users or operators of system 100 or its components to input commands, instructions, data, settings, and the like.

Output devices 460, in some examples, may be configured to provide output to a user through visual or auditory channels. For example, output devices 460 display a user interface including one or more virtual spheres as described herein. Output devices 460 may include a video graphics adapter card, a liquid crystal display (LCD) monitor, a light emitting diode (LED) monitor, an organic LED monitor, a sound card, a speaker, a projector, or any other device capable of generating output that may be intelligible to a user. Output devices 460 may also include a touchscreen, presence-sensitive display, or other input/output capable displays known in the art.

Computer system 400, in some example embodiments, also includes a communication module such as network interface 470. Network interface 470 can be utilized to communicate with external devices via one or more networks such as one or more wired, wireless, or optical networks including, for example, the Internet, intranet, local area network, wide area network, cellular phone networks, Bluetooth radio, and an IEEE 802.11-based radio frequency network, among others. Network interface 470 may be a network interface card, such as an Ethernet card, an optical transceiver, a radio frequency transceiver, or any other type of device that can send and receive information.

Operating system of computer system 400 may control one or more functionalities of computer system 400 or components thereof. For example, the operating system of computer system 400 may interact with software applications of computer system 400 and may facilitate one or more interactions between the software applications and one or more of processors 410, memory 420, storage devices 430, input devices 450, and output devices 460. The operating system of computer system 400 may interact with the software applications and components thereof. In some embodiments, the software applications may be included in the operating system of computer system 400. In these and other examples, virtual modules, firmware, or software of the software applications. In other examples, virtual modules, firmware, or software may be implemented externally to computer system 400, such as at a network location. In some such instances, computer system 400 may use network interface 470 to access and implement functionalities provided by virtual modules, firmware, or software for vehicle identification through methods commonly known as "cloud computing."

Thus, the methods and systems for displaying and navigating through digital content using the virtual sphere have been described. Although embodiments have been described with reference to specific example embodiments, it will be evident that various modifications and changes can be made to these example embodiments without departing from the broader spirit and scope of the present document. Accordingly, the specification and drawings are to be regarded in an illustrative rather than a restrictive sense.

What is claimed is:

1. A system, comprising:
    a content module for storing digital content;
    a user interface displayable by a mobile application or a web page, wherein the user interface enables a user to interact with the digital content, wherein the digital content includes a plurality of content units;
    a content navigation module configured to:
        cause displaying a virtual sphere through the user interface, the virtual sphere representing the digital content;
        present a plurality of actionable buttons on a surface of the virtual sphere, wherein each actionable button is associated with one of the plurality of content units;
        position the virtual sphere in response to a user input;
        activate one of the actionable buttons in response to another user input;
        present, through the user interface, one of the content units that corresponds to the one of the actionable buttons that was activated by the user; and
    wherein when the user interface presents one of the content units and the virtual sphere is not displayed through the user interface.

2. The system of claim 1, wherein a content server includes the content module for storing the digital content, and wherein a web server includes the content navigation module.

3. The system of claim 1, further comprising a health control module configured to monitor user activity and cause providing a meditation sound therapy through the user interface, wherein the meditation sound therapy is provided based on the user activity.

4. The system of claim 1, wherein one or more of the content units are unlocked content units which are readily available for access by the user, while the remaining ones of the content units are locked content units which are unavailable for access by the user, and wherein the user interface is configured to unlock one or more of the locked content units.

5. The system of claim 1, wherein the digital content includes text and interactive multimedia content.

6. A system, comprising:
    a content module for storing digital content;
    a user interface displayable by a mobile application or a web page, wherein the user interface enables a user to interact with the digital content and wherein the digital content includes a plurality of content units;
    a content navigation module configured to:
        cause displaying a virtual sphere through the user interface, the virtual sphere representing the digital content;
        present a plurality of actionable buttons on a surface of the virtual sphere, wherein each actionable button is associated with one of the plurality of content units;
        position the virtual sphere in response to a user input;
        activate one of the actionable buttons in response to another user input;
        present, through the user interface, one of the content units that corresponds to the one of the actionable buttons that was activated by the user; and
    wherein the digital content includes a digital book containing a plurality of pages, and wherein the user interface enables the user to access a desired page in three or less user inputs and wherein the user input causes rotation of the virtual sphere and the another user input activates one of the actionable buttons, the one of the actionable buttons being associated with a portion of the digital content, and wherein a third user input causes opening of the desired page of the digital book.

7. The system of claim 6, wherein the user interface is configured to enable the user to interact with the virtual sphere through user inputs.

8. The system of claim 6, wherein one or more of the actionable buttons are represented by a gore of the virtual sphere.

9. The system of claim 6, wherein one or more of the actionable buttons are represented by a part of a gore of the virtual sphere.

10. The system of claim 6, wherein the digital content includes a digital book, and wherein each of the content units represents a chapter of the digital book.

11. The system of claim 6, wherein one or more of the content units are unlocked content units which are readily available for access by the user, while the remaining ones of the content units are locked content units which are unavailable for access by the user.

12. The system of claim 11, wherein the user interface is configured to unlock one or more of the locked content units.

13. The system of claim 12, wherein the user interface is configured to unlock one or more of the locked content units upon a user payment.

14. The system of claim 12, wherein the user interface is configured to unlock one or more of the locked content units upon determining that the user read or viewed one or more of the unlocked content units.

15. A system, comprising:
    a content module for storing digital content;
    a user interface displayable by a mobile application or a web page, wherein the user interface enables a user to interact with the digital content and wherein the digital content includes a plurality of content units;
    a content navigation module configured to:
        cause displaying a virtual sphere through the user interface, the virtual sphere representing the digital content;
        present a plurality of actionable buttons on a surface of the virtual sphere, wherein each actionable button is associated with one of the plurality of content units;
        position the virtual sphere in response to a user input;
        activate one of the actionable buttons in response to another user input;
        present, through the user interface, one of the content units corresponding to the one of the actionable buttons activated by the user; and
        present a meditation sound therapy through the user interface, wherein the meditation sound therapy is presented upon determining that the user is actively engaged with the digital content through the user interface for longer than a predetermined period.

16. The system of claim 15, wherein the meditation sound therapy is presented upon receiving a user input activating a predetermined actionable button arranged on the surface of the virtual sphere.

\* \* \* \* \*